United States Patent
Chae et al.

(10) Patent No.: US 10,153,517 B2
(45) Date of Patent: Dec. 11, 2018

(54) SODIUM SECONDARY BATTERY

(71) Applicants: SK Innovation Co., Ltd., Seoul (KR); Ceramatec, Inc., Salt Lake City, UT (US)

(72) Inventors: JeHyun Chae, Daejeon (KR); JeongSoo Kim, Daejeon (KR); JongSeon Kim, Daejeon (KR); Sai Bhavaraju, West Jordan, UT (US)

(73) Assignees: SK Innovation Co., Ltd., Seoul (KR); Field Upgrading USA, Inc., Denver, CO (US)

( * ) Notice: Subject to any disclaimer, the term of this patent is extended or adjusted under 35 U.S.C. 154(b) by 0 days.

(21) Appl. No.: 14/824,500

(22) Filed: Aug. 12, 2015

(65) Prior Publication Data

US 2016/0049658 A1 Feb. 18, 2016

(30) Foreign Application Priority Data

Aug. 13, 2014 (KR) .................. 10-2014-0104896

(51) Int. Cl.

| | |
|---|---|
| *H01M 10/00* | (2006.01) |
| *H01M 10/0568* | (2010.01) |
| *H01M 10/0569* | (2010.01) |
| *H01M 10/39* | (2006.01) |

(52) U.S. Cl.
CPC ... *H01M 10/0568* (2013.01); *H01M 10/0569* (2013.01); *H01M 10/3918* (2013.01); *H01M 10/3954* (2013.01); *H01M 2300/0028* (2013.01); *H01M 2300/0068* (2013.01)

(58) Field of Classification Search
CPC ........ H01M 10/0568; H01M 10/0569; H01M 2300/0028; H01M 10/3954; H01M 2300/0068
See application file for complete search history.

(56) References Cited

U.S. PATENT DOCUMENTS

| | | | | |
|---|---|---|---|---|
| 3,476,602 | A | * 11/1969 | Brown | ..... H01M 6/20 429/104 |
| 2003/0054255 | A1 | 3/2003 | Hidaka et al. | |
| 2012/0021273 | A1* | 1/2012 | Ohmori | ..... H01M 2/1686 429/144 |
| 2014/0050974 | A1* | 2/2014 | Miyuki | ..... H01M 4/136 429/188 |

(Continued)

FOREIGN PATENT DOCUMENTS

KR 19960002926 A 1/1996

*Primary Examiner* — Cynthia H Kelly
*Assistant Examiner* — Monique M Wills
(74) *Attorney, Agent, or Firm* — The Webb Law Firm

(57) ABSTRACT

Provided is a sodium secondary battery including: an anode containing sodium; a cathode containing sulfur; a cathode electrolyte solution being in contact with the cathode and capable of conducting sodium ions into and from a solid electrolyte membrane; and a solid electrolyte separating the anode and the cathode electrolyte solution and having sodium ion conductivity. The sodium secondary battery of the present invention overcomes the problems of thermal management and heat sealing due to a high operating temperature, possessed by the existing sodium-sulfur battery or sodium-nickel chloride battery (so called, a ZEBRA battery), and may achieve high a charge and discharge mechanism characteristic.

5 Claims, 1 Drawing Sheet

(56) References Cited

U.S. PATENT DOCUMENTS

| | | | | |
|---|---|---|---|---|
| 2014/0065492 A1* | 3/2014 | Komaba | ............... | H01M 4/134 429/337 |
| 2014/0308583 A1* | 10/2014 | Manthiram | ........... | H01M 4/362 429/220 |
| 2015/0093624 A1* | 4/2015 | Bogdan, Jr. | ......... | H01M 10/399 429/112 |
| 2016/0087313 A1* | 3/2016 | Bhavaraju | ............... | H01M 2/40 429/103 |

\* cited by examiner

SODIUM SECONDARY BATTERY

CROSS-REFERENCE TO RELATED APPLICATION

This application claims priority to Korean Patent Application No. 10-2014-0104896 filed Aug. 13, 2014, the disclosure of which is hereby incorporated in its entirety by reference.

TECHNICAL FIELD

The following disclosure relates to a sodium secondary battery, and more particularly, to a sodium secondary battery including an anode containing sodium, a cathode containing sulfur in a solid state and a positive electrolyte, and a solid electrolyte membrane between the anode and the cathode.

BACKGROUND

A battery is a known device used in storage and release of electric energy for various applications. In order to produce electric energy, a battery typically directly converts chemical energy into electric energy. Generally, a single battery includes one or more galvanic cells, where each cell is composed of two half cells electrically separated except for leading to an external circuit. During discharge, electrochemical reduction occurs in the cathode of the battery, and electrochemical oxidation occurs in the anode of the battery. While in the battery, the cathode and the anode are not in contact with each other physically, they are generally, chemically connected to each other by one or more ion-conductive and electrical electrothermal electrolytes, which may be in a solid state, a liquid state, or in a combination thereof. In case where an external circuit or load is connected to a terminal connected to an anode, and a terminal connected to a cathode, the battery drives electrons through an external circuit, and ions move through an electrolyte.

Batteries may be classified in various manners. For example, a battery completely discharged for one use is often referred to as a primary battery, or a primary cell. However, a battery discharged and rechargeable for more than one use is often referred to as a secondary battery or a secondary cell. The ability of a battery or a cell to be charged and discharged multiple times depends on the Faradaic efficiency of each charge and discharge cycle.

A sodium-based rechargeable battery includes various materials and designs, and many sodium batteries requiring a high Faradaic efficiency uses a solid primary electrolyte separator. A major advantage of using a solid ceramic primary electrolyte membrane is to achieve 100% of the Faradaic efficiency of the obtained battery. Actually, in most of other battery designs, a negative electrolyte solution and a positive electrolyte solution of the battery may be mixed with time, and thus, reduction of a Faradaic efficiency and loss of a battery capacity are induced.

A primary electrolyte separator used in a sodium battery requiring high Faradaic efficiency is often composed of an ion conductive polymer, an ion conductive liquid or gel-permeated porous material, or high-density ceramic. In this regard, most, but not all of the rechargeable sodium batteries which may be currently used for a commercial use include a molten sodium metal anode, a sodium $\beta''$-alumina ceramic electrolyte separator, and a molten cathode (which may include a composite of molten sulfur and carbon (referred to as a sodium/sulfur battery), molten $NiCl_2$, $NaCl$, $FeCl_2$ and/or $NaAlCl_4$ (referred to as a ZEBRA battery)).

Despite the advantageous properties related to several typical sodium-based rechargeable batteries, such batteries may have significant disadvantages. In one example, since the sodium $\beta''$-alumina ceramic electrolyte separator may typically have higher conductivity, and is wetted well by molten sodium at a temperature above about 270° C., and/or typically a temperature above 300° C. is needed in order that sodium polysulfides remain in a molten state in a cathode, the battery undergoes significant thermal management and heat-sealing problems. For example, some sodium-based rechargeable batteries may have difficulties in removing heat from the batteries or maintaining the anodes and cathodes at relatively high operating temperature.

In another example, some sodium-based batteries may cause a significant safety problem, due to their relatively high operating temperature.

In another example, some sodium-based batteries require a battery component capable of being operated at a high temperature. Therefore, such component may be relatively expensive.

In another example, since a relatively large amount of energy may be needed in order to heat some general sodium-based batteries to a relatively high operating temperature, such a battery may require much money to be operated, while still being energy inefficient.

That is, in the case of the existing sodium-based secondary battery such as a sodium-sulfur battery or a sodium-nickel chloride battery, conductivity and a melting point of battery components should be considered.

The sodium-nickel chloride battery should be operated at least at 250° C., and the sodium-sulfur battery has an operating temperature of at least 300° C.

Due to such problems, those batteries are very disadvantageous in an economic aspect in view of manufacturing or operation for reinforcement of temperature maintenance, sealability maintenance and safety.

PRIOR ART DOCUMENTS

Patent Documents (Patent Document 1) Korean Patent Laid-Open Publication No. 1996-0002926
(Patent Document 2) U.S. Patent Application Publication No. 2003-0054255

SUMMARY

An embodiment of the present invention is directed to providing a sodium secondary battery capable of a low temperature operation and having a high output by overcoming a high temperature operation problem and a thermal management problem possessed by the existing sodium sulfur battery and sodium-nickel chloride battery (so called, a ZEBRA battery).

In one general aspect, a sodium secondary battery includes: an anode containing sodium (Na); a cathode containing sulfur (S); a cathode electrolyte solution being in contact with the cathode and capable of conducting sodium ions into and from a solid electrolyte membrane; and a solid electrolyte (separator) separating the anode and the cathode electrolyte solution and having sodium ion conductivity, wherein the sodium in the anode is melted at an operating temperature of the sodium secondary battery.

In the sodium secondary battery according to an exemplary embodiment of the present invention, the cathode electrolyte solution may be a solution of a sodium salt of the following Chemical Formula 1 dissolved in an organic solvent:

NaY [Chemical Formula 1]

wherein Y is one or more selected from the group consisting of $ClO_4$, $PF_6$, $BF_4$, $CF_3SO_3$, $AlCl_4$, $AlBr_4$, $AlI_4$ and $N(CF_3SO_2)_2$.

In the sodium secondary battery according to an exemplary embodiment of the present invention, the cathode electrolyte solution may be a molten phase of a sodium salt of the following Chemical Formula 2:

$NaM(X1)_n(X2)_{4-n}$ [Chemical Formula 2]

wherein M is an element selected from the group consisting of metals and metalloids having an oxidation number of 3; and X1 and X2 are halogen elements different from each other; and n is a real number of $0 \leq n \leq 4$.

In the sodium secondary battery according to an exemplary embodiment of the present invention, a cathode reaction of following Reaction Formula 1 may occur during discharge, and a cathode reaction of following Reaction Formula 2 may occur during charge:

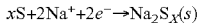
$xS + 2Na^+ + 2e^- \rightarrow Na_2S_x(s)$ [Reaction Formula 1]

wherein (s) refers to a solid state; and x is a natural number from 1 to 5,

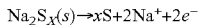
$Na_2S_x(s) \rightarrow xS + 2Na^+ + 2e^-$ [Reaction Formula 2]

wherein (s) refers to a solid state; and x is a natural number from 1 to 5.

In the sodium secondary battery according to an exemplary embodiment of the present invention, the sulfur in the cathode may be a liquid phase.

In the sodium secondary battery according to an exemplary embodiment of the present invention, the operating temperature of the sodium secondary battery may be 100° C. to 200° C.

In the sodium secondary battery according to an exemplary embodiment of the present invention, the sodium ion conductive solid electrolyte (separator) may be a sodium superionic conductor (NASICON).

Other features and aspects will be apparent from the following detailed description, the drawings, and the claims.

DETAILED DESCRIPTION OF EMBODIMENTS

Figure 1:
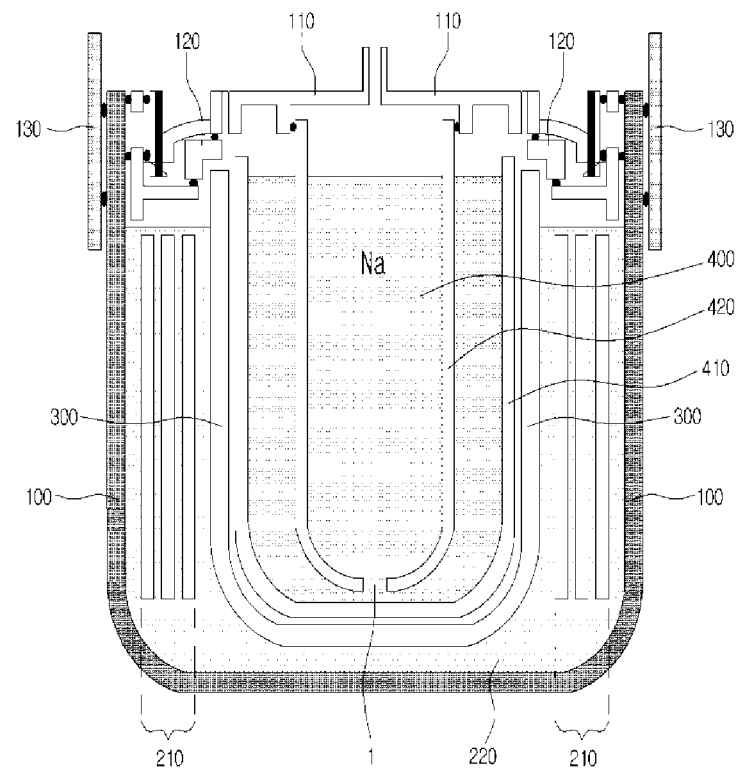
FIG. 1 is a cross-sectional view of a sodium secondary battery according to an exemplary embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a technical idea of the present invention will be described in more detail with reference to the accompanying drawings and the exemplary embodiments. However, the present invention is not limited to the following drawings and the exemplary embodiments, and it is evident to a person skilled in the art that the present invention may be changed or modified variously within the technical idea and the scope of the present invention.

Further, the drawings and the exemplary embodiments introduced in the following are provided as an example for sufficiently delivering the concept of the present invention to a person skilled in the art. Therefore, the present invention is not limited to the drawings and the exemplary embodiments set forth herein but may be modified in many different forms.

Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

The sodium secondary battery according to an exemplary embodiment of the present invention includes: an anode containing sodium (Na); a cathode containing sulfur (S); a cathode electrolyte solution being in contact with the cathode, and capable of conducting sodium ions into and from a solid electrolyte membrane; and a solid electrolyte (separator) separating the anode and the cathode electrolyte solution and having sodium ion conductivity, wherein the sodium in the anode is melted at an operating temperature of the sodium secondary battery.

Specifically, the sodium secondary battery according to an exemplary embodiment of the present invention may include: an anode containing molten sodium; a cathode containing sulfur; a cathode electrolyte solution being in contact with the cathode, and capable of conducting sodium ions; and a sodium ion-conductive solid electrolyte separating the anode and the cathode electrolyte solution.

More specifically, the sodium secondary battery according to an exemplary embodiment of the present invention may include: an anode containing molten sodium; a anode current collector being in contact with the anode to collect current, and providing a current migration path; a cathode containing sodium polysulfides, based on the discharged state; a cathode current collector being in contact with the cathode to collect current and providing a current migration path; a cathode electrolyte solution being in contact with the cathode, and capable of conducting sodium ions; and a sodium ion-conductive solid electrolyte separating the anode and the cathode electrolyte solution.

In an exemplary embodiment of the present invention, the cathode electrolyte solution serves to smoothly move sodium ions introduced through the solid electrolyte, and at the same time, may directly participate in a charge and discharge reaction of the battery.

Therefore, by disposing an anode containing sodium in a molten state; a cathode containing sulfur; and a cathode solution conducting sodium ions as an electrolyte between the cathode and the solid electrolyte, an operation at a low temperature of 200° C. or less, as a practical example, an operation at a low temperature of 100 to 200° C. is possible.

Specifically, in an exemplary embodiment of the present invention, during discharge of the battery, sulfur contained in the cathode is oxidized in the anode and bonded to a sodium ion introduced through the solid electrolyte to produce sodium polysulfides ($Na_2S_x$) as described below:

$$xS(l)+2Na^++2e^-\rightarrow Na_2S_x(s)$$ ($x$ is a natural number from 1 to 5)

Herein, S(I) may be sulfur in a molten state at the operating temperature of the battery; and $Na_2S_x(s)$ produced by the discharge reaction may be sodium polysulfides in a solid state.

In the case of the existing sodium-sulfur battery, the sodium polysulfides ($Na_2S_x$) produced in the cathode should be present in a liquid state, and thus, a high temperature operation at 300° C. or more which causes thermal management and sealing problems, and maintaining x to be 3 or more in the sodium polysulfides, were required.

However, in the battery according to an exemplary embodiment of the present invention, a separate positive electrolyte in a liquid state (cathode electrolyte solution) is provided, and thus, as described above, a battery reaction is carried out by sodium polysulfides in a solid state, which allows a low temperature operation at 200° C. or less, as a practical example, at 100 to 200° C.

Specifically, in the sodium secondary battery according to an exemplary embodiment of the present invention, a cathode reaction of following Reaction Formula 1 may occur during discharge, and a cathode reaction of following Reaction Formula 2 may occur during charge.

$$xS+2Na^++2e^-\rightarrow Na_2S_x(s) \quad \text{[Reaction Formula 1]}$$

wherein (s) refers to a solid state; and x is a natural number from 1 to 5, $$Na_2S_x(s)\rightarrow xS+2Na^++2e^- \quad \text{[Reaction Formula 2]}$$

wherein (s) refers to a solid state; and x is a natural number from 1 to 5.

In the battery according to an exemplary embodiment of the present invention, if the operating temperature is identical to or higher than the melting point of sulfur (S), for a specific example, 120° C. or more, the sulfur (S) in the Reaction Formulae 1 and 2 may be a liquid phase (a molten phase).

In the battery according to an exemplary embodiment of the present invention, if the operating temperature is identical to or lower than the melting point of sulfur (S), for a specific example, 120° C. or less, the sulfur (S) in the Reaction Formulae 1 and 2 may be a solid phase.

That is, if the operating temperature of the battery is identical to or higher than the melting point of sulfur, the battery according to an exemplary embodiment of the present invention may form sodium polysulfides in a solid phase ($Na_2S_x(s)$, wherein x is a natural number of 1 to 5) by combining reaction of sulfur mixed with the cathode electrolyte solution in a liquid state, sodium ions introduced from the anode through the solid electrolyte, and electrons supplied through the cathode current collector during charging, as described in the Reaction Formula 1. Herein, the sodium polysulfides form a nucleus and grow at a surface of the cathode current collector supplying electrons, thereby forming a state of being bound to the surface of the cathode current collector.

Further, the sodium polysulfides in a solid phase positioned at the surface of the cathode current collector donate electrons during discharge, thereby producing liquid phase sulfur and sodium ions, and the produced sodium ions may be introduced to the anode through the cathode electrolyte solution and the solid electrolyte.

In the Reaction Formulae 1 and 2, in case where the sulfur is a liquid phase, in the current collector providing charges, a cathode reaction may occur on the entire surface of the current collector being in contact with the cathode electrolyte solution, which is more advantageous.

As described above, the battery according to an exemplary embodiment of the present invention may have the operating temperature of 200° C. or less, as a practical example, 100 to 200° C., and if the operating temperature is 120 to 200° C., the battery according to an exemplary embodiment of the present invention may contain liquid (molten phase) sulfur in the cathode based on the charged state, and the liquid sulfur may be in the state of being mixed with the cathode electrolyte solution.

Accordingly, the battery according to an exemplary embodiment of the present invention may include, an anode containing molten sodium; an anode current collector being in contact with the anode to collect current and providing a current migration path; a cathode containing liquid (molten phase) sulfur; a cathode electrolyte solution capable of conducting sodium ions; a cathode current collector being in contact with a mixed solution of the liquid sulfur and the cathode electrolyte solution to collect current and providing the current migration path; and sodium ion conductive solid electrolyte separating the anode and the mixed solution, based on the charged state. Herein, it goes without saying that unreacted sodium polysulfides may be in a coated or settled state on the cathode current collector.

This will be described in detail as follow: the battery according to an exemplary embodiment of the present invention may include: a sodium ion conductive solid electrolyte dividing a cathode space and an anode space; an anode containing molten sodium and filling the anode space to a certain height; an anode current collector charged to the anode; a mixed solution of molten sulfur being a cathode and a cathode electrolyte solution capable of conducting sodium ions, filling the cathode space to a certain height; and a cathode current collector charged to the mixed solution, based on the charged state.

Further, the battery according to an exemplary embodiment of the present invention may include a sodium ion conductive solid electrolyte dividing a cathode space and an anode space; an anode containing molten sodium and filling the anode space to a certain height; an anode current collector charged to the anode; a cathode electrolyte solution capable of conducting sodium ions, and filling the cathode space to a certain height; and a cathode containing sodium polysulfides coated or settled on a surface of a cathode current collector charged to the cathode electrolyte solution, based on the discharged state.

In the sodium secondary battery according to an exemplary embodiment of the present invention, the cathode containing sulfur, sodium polysulfides, or sulfur and sodium polysulfides may further contain a conductive material. The conductive material may prevent deterioration of a cathode characteristic due to low electrical conductivity of sodium polysulfides, in the case of forming a large amount of sodium polysulfides by a cathode reaction. The conductive material may be any material, as long as it is generally used for improving electrical conductivity of an active material layer in the field of a secondary battery. As a specific example, carbon, nickel, titanium, yttrium, calcium, chromium, cobalt, zinc, graphite, graphene or a mixture thereof may be included, but the present invention is not limited to those materials. If the cathode further contains the conductive material, it may contain 0.5 to 20 parts by weight of the conductive material, based on 100 parts by weight of sodium polysulfides.

In the sodium secondary battery according to an exemplary embodiment of the present invention, the cathode electrolyte solution may be a solution of a sodium salt dissolved in an organic solvent. Specifically, the sodium salt being a solute of the cathode electrolyte solution may be one or two or more materials selected from the group consisting of the materials satisfying Chemical Formula 1:

NaY  [Chemical Formula 1]

wherein Y is one or more selected from the group consisting of $ClO_4$, $PF_6$, $BF_4$, $CF_3SO_3$, $AlCl_4$, $AlBr_4$, $AlI_4$ and $N(CF_3SO_2)_2$. Herein, in the definition of the Chemical Formula 1, ionic valences are not indicated for a clear understanding, but of course, Y, being paired with and bonded to $Na^+$, the monovalent cation to form the salt, is a monovalent anion.

Preferably, the sodium salt contained in the cathode electrolyte solution may be $NaAlY'_4$ (Y' is Cl, Br or I). This allows more stable and rapid conduction of sodium ions in a low temperature operation at 200° C. or less, as a practical example, 100 to 200° C.

In the case where the cathode electrolyte solution is a solution of the sodium salt dissolved in an organic solvent, if the content of the sodium salt in the cathode electrolyte solution is too low, there are risks of reducing a charge and discharge rate due to lack of the amount of the sodium salt to participate in an electrochemical reaction, reducing an energy capacity per unit volume for the whole battery, and increasing a resistance value due to a low ion conductivity in the solution. If the content of the sodium salt in the cathode electrolyte solution is too high, there is a risk of reducing the sodium ion conductivity by the precipitate. Accordingly, the cathode electrolyte solution may contain 5 to 30 wt % of sodium salt.

If the cathode electrolyte solution is a solution of the sodium salt dissolved in an organic solvent, the organic solvent may be any solvent if it dissolves the sodium salt, is chemically stable in a battery operating (charge and discharge) condition, and maintains conductivity of the sodium ions stably for a long period. As a specific example, the organic solvent may be one or more selected from the group consisting of alcohol-based, polyhydric alcohol-based, heterocyclic hydrocarbon-based, amide-based, ester-based, ether-based, lactone-based, carbonate-based, phosphate-based, sulfone-based and sulfoxide-based solvents. As a non-limiting example, the organic solvent may be one or more solvents selected from the group consisting of 1,2-ethanediol, 1,2-propanediol, 1,3-propanediol, 1,2-butanediol, 1,3-butanediol, 1,4-butanediol, 1,5-pentanediol, 2,2-dimethylpropan-1,3-diol, 2-butyl-2-ethylpropan-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, N,N-dimethylformamide, N,N-dimethylacetamide, N,N-diethylacetamide, N,N-dimethyl trifluoroacetamide, hexamethyl phosphoramide, acetonitrile, propionitrile, butyronitrile, α-terpineol (Terpineol), β-terpineol, dihydroterpineol, N-methyl-2-pyrrolidone (NMP), dimethylsulfoxide, pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pteridine, phenazine, phenothiazine, phenoxazine, acridine, ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethyl methyl carbonate, 2,2,2-trifluoroethyl methyl carbonate, methyl propyl carbonate, ethyl propyl carbonate, 2,2,2-trifluoroethyl propyl carbonate, methyl formate, ethyl formate, propyl formate, butyl formate, dimethyl ether, diethyl ether, dipropyl ether, methyl ethyl ether, methyl propyl ether, ethyl propyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone, σ-valerolactone, γ-caprolactone, ε-caprolactone, β-propiolactone, tetrahydrofuran, 2-methyl tetrahydrofuran, 3-methyl tetrahydrofuran, trimethyl phosphate, triethyl phosphate, tris(2-chloroethyl)phosphate, tris(2,2,2-trifluoroethyl)phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl methyl) sulfone, di(pentafluoroethyl) sulfone, trifluoromethyl pentafluoroethyl sulfonate, trifluoromethyl nonafluorobutyl sulfone, pentafluoroethyl nonafluorobutyl sulfone, sulfolane, 3-methyl sulfolane, 2-methyl sulfolane, 3-ethyl sulfolane and 2-ethyl sulfolane.

In the sodium secondary battery according to an exemplary embodiment of the present invention, the cathode electrolyte solution may be a molten phase of a sodium salt of the following Chemical Formula 2.

$NaM(X1)_n(X2)_{4-n}$  [Chemical Formula 2]

wherein M is an element selected from the group consisting of metals and metalloids having an oxidation number of 3; and X1 and X2 are different halogen elements from each other; and n is a real number of $0 \leq n \leq 4$.

Specifically, in the sodium secondary battery according to an exemplary embodiment, the cathode electrolyte solution may be a molten phase of a sodium salt according to the following Chemical Formula 2-1 or a molten phase of a composite sodium salt according to the following Chemical Formula 2-2:

$NaMX_4$  [Chemical Formula 2-1]

wherein M is as defined in the Chemical Formula 2; and X is a halogen element. That is, Chemical Formula 2-1 is a specified formula wherein n is 0 or 4 in Chemical Formula 2, and herein M is an element selected from the group consisting of metals and metalloids having an oxidation number of 3; and X is Cl, Br or I:

$$NaM(X1)_n(X2)_{4-n}$$ [Chemical Formula 2-2]

wherein M, X1 and X2 are as defined in Chemical Formula 2; and n is a real number of 0<n<4. That is, the Chemical Formula 2-2 is a specified formula of a composite sodium salt containing two or more halogen elements different from each other in Chemical Formula 2, and herein, M is an element selected from the group consisting of metals and metalloids having an oxidation number of 3; and X1 and X2 are halogen elements different from each other.

If the cathode electrolyte solution is a molten salt of the sodium salt satisfying Chemical Formula 2, specifically the Chemical Formula 2-1 or 2-2, the organic solvent as a component of the cathode electrolyte solution may not be contained, and thus, the sodium ion conductivity in the cathode electrolyte solution may be secured stably for a long period, and as raw materials in a solid state are used in the manufacture of the battery, it is easy to manufacture and seal the battery.

If the cathode electrolyte solution is a molten salt of the sodium salt satisfying Chemical Formula 2, it is more preferred to use the molten salt of the composite sodium salt satisfying Chemical Formula 2-2 as the cathode electrolyte solution. It is because in case of the sodium salt satisfying Chemical Formula 2-2, a melting point is very low without reducing ion conductivity, thereby being very suitable for a low temperature operation, and having a stable conducting capacity of sodium ions.

Specifically, in order to have a pair forming a molten salt electrolyte having a melting point below a certain degree, for X1-X2 being halogen elements different from each other, X1 may be chlorine (Cl) and X2 may be iodine (I), or X1 may be chlorine (Cl) and X2 may be bromine (Br). In order to lower the melting point of the sodium salt satisfying Chemical Formula 2-2 to 150° C. or less, X1 is chlorine (Cl) and X2 is iodine (I), and in that case, n may be 2.0≤n≤3.8, and if X1 is chlorine (Cl) and X2 is brome (Br), n may be 0.2≤n≤3.8. M may be an element selected from the group consisting of metals and metalloids having an oxidation number of 3, and specifically, selected from boron, aluminum, gallium or indium.

In the secondary battery according to the present invention, the cathode electrolyte solution capable of conducting sodium ions may include any material suitable for a battery function as intended, in addition to the sodium salt.

As described above, the secondary battery according to an exemplary embodiment of the present invention may further include a cathode current collector. Specifically, the secondary battery may further include a cathode current collector being in contact with an active material participating in the charge and discharge of the battery to collect current and providing a current migration path to the outside. Herein, the expression "the cathode current collector being in contact with the cathode" may refer to a state where the cathode current collector and the cathode are physically contacted or engaged to each other, if the cathode is a solid phase like sodium polysulfides. Simultaneously, when the operation is carried out at an operating temperature higher than the melting point of sulfur, so that the cathode contains liquid sulfur, the expression may refer to the structure where the cathode current collector is impregnated in the liquid component of the cathode.

The cathode current collector (or anode current collector) may be a porous conductor, and more specifically, may be foam, a film, mesh, felt or a perforated film of a conductive material. More specifically, the cathode current collector (or anode current collector) may be a conductive material including graphite, graphene, titanium, copper, platinum, aluminum, nickel, silver, gold or a carbon nanotube having excellent conductivity and being chemically stable during the charge and discharge of a battery, or a composite coated or stacked with different conductive materials.

In an exemplary embodiment according to the sodium secondary battery of the present invention, the sodium secondary battery may have a structure of a general sodium-sulfur battery or a general sodium-nickel hydroxide battery having molten sodium as an anode. The sodium in the anode is present in a molten state, and the sodium secondary battery is operable at any appropriate operating temperature allowing the sodium in the anode to be in a molten state. As some examples, the battery is operable at a temperature from the melting point of sodium (98° C.) to 200° C., preferably from 100° C. to 200° C., more preferably from 100° C. to 150° C., still more preferably from 120° C. to 150° C.

In an exemplary embodiment according to the sodium secondary battery of the present invention, the sodium secondary battery wherein the sodium polysulfides ($Na_2S_x$) produced in the following Reaction Formula in the cathode of the secondary battery are in a solid state, may be included:

$$xS+2Na^{+}+2e^{-} \rightarrow Na_2S_x(s)$$ [Reaction Formula]

wherein x is a natural number of 1 to 5.

As described above, the sodium polysulfides are in a solid state at an operating temperature of the sodium secondary battery, and the electrolyte in the positive electrolyte solution conducts sodium ions from the anode.

In an exemplary embodiment according to the sodium secondary battery of the present invention, sulfur in the cathode may be present in a solid or liquid state at an operating temperature of the sodium secondary battery.

In an exemplary embodiment according to the sodium secondary battery of the present invention, a sodium secondary battery includes an anode containing sodium (Na); a cathode containing sulfur (S); a cathode electrolyte solution being in contact with the cathode, and capable of conducting sodium ions into and from a solid electrolyte membrane; and a solid electrolyte (separator) separating the anode and the cathode electrolyte solution and having sodium ion conductivity, wherein the sodium in the anode is melted at an operating temperature of the sodium secondary battery, and an operating temperature of the sodium secondary battery is 100° C. to 200° C.

As an exemplary embodiment, at the operating temperature, sodium in the anode is in a molten state, sulfur in the cathode is present in a solid or liquid state, and the electrolyte in the positive electrolyte solution is present in a molten or dissolved state, thereby serving to conduct sodium ions passed through the solid electrolyte from the anode.

In an exemplary embodiment according to the sodium secondary battery of the present invention, the solid electrolyte having sodium ion conductivity may include a solid electrolyte generally used in a battery field for selective conduction of sodium ions, and as an example, sodium superionic conductor (NASICON) may be included, but not limited thereto.

In an exemplary embodiment according to the sodium secondary battery of the present invention, the sodium superionic conductor (NASICON) may include a Na—Zr—Si—O-based composite oxide, a Na—Zr—Si—P—O-based composite oxide, a Y-doped Na—Zr—Si—P—O-based composite oxide, a Fe-doped Na—Zr—Si—P—O-based composite oxide, or a mixture thereof, and as a practical example, Y or Fe-doped $Na_3Zr_2Si_2PO_{12}$, Y or Fe-doped $Na_{1+x}Si_xZr_2P_{3-x}O_{12}$ ($1.6<x<2.4$), or a mixture thereof may be included.

FIG. 1 shows an example illustrating the structure of the sodium secondary battery (based on a discharged state) according to an exemplary embodiment. As illustrated in FIG. 1, the sodium secondary battery according to an exemplary embodiment may include a cylindrical metal housing 100 of which the lower end is closed and the upper end is opened, and a tubular solid electrolyte 300 (hereinafter, referred to as a solid electrolyte tube) of which lower end is closed, a safety tube 410, and a wicking tube 420, placed in the inside of the metal housing 100, and positioned in order from outside to inside of the metal housing 100, respectively.

Specifically, the wicking tube 420, positioned on an innermost side, that is a center of the metal housing 100 may have a tube shape having a through hole 1 formed on a lower end, and the safety tube 410, positioned on the outside of the wicking tube 420 may have a structure surrounding, at a certain distance from, the wicking tube 420.

An anode 400 containing molten sodium, equipped in the inside of the wicking tube 420 has a structure filling an empty space between the wicking tube 420 and the safety tube 410 via a through hole 1 formed on a lower side of the wicking tube 420. A dual structure of the wicking tube 420 and the safety tube 410 prevents a violent reaction between a cathode material and an anode material at the time of breakage of the solid electrolyte tube 300, and allows the level of the molten sodium to be maintained constantly even at the time of discharge by a capillary force.

The solid electrolyte tube 300 is positioned on the outside of the safety tube 410 to surround the safety tube 410, and may be a tube-shaped solid electrolyte having selective permeability to sodium ions ($Na^+$).

In the space between the solid electrolyte tube 300 surrounding the safety tube 410 and the metal housing 100, a cathode electrolyte solution 220 being in contact with a cathode and containing an electrolyte capable of conducting sodium ions into and from a solid electrolyte membrane, and a cathode 210 containing sodium polysulfides in a solid state, may be provided.

That is, the sodium secondary battery according to an exemplary embodiment has a concentric structure wherein the wicking tube 420, the safety tube 410, the solid electrolyte tube 300, and the metal housing 100 are positioned in order from the inside to the outside, and in the inside of the wicking tube 420, an anode 400 containing molten sodium is supported, and in the space between the solid electrolyte tube 300 and the metal housing 100, a cathode electrolyte solution 220 being in contact with a cathode and capable of conducting sodium ions into and from a solid electrolyte membrane is provided, and the cathode 210 containing sodium polysulfides in a solid state is provided so as to be impregnated into the cathode electrolyte solution 220. Herein, though not shown in the drawing separately, of course, the cathode current collector being in contact with the cathode 210 may be provided, and the inner side of the metal housing may serve as the cathode current collector.

Moreover, the sodium battery according to an exemplary embodiment may further include a cover 110 positioned on the top of the metal housing 100 to close the inside of the metal housing, an insulator 120 having a ring shape and positioned on the upper side of the metal housing 100 to electrically insulate the space between the metal housing 100 and the solid electrolyte tube 300, and an electrode terminal 130 positioned on the upper end circumference of the metal housing 100. In addition, in order to minimize the evaporation of the electrolyte solution, the internal pressure of the battery sealed by the cover 110 immediately after manufacture may be 15 psi or more, and of course, the cathode containing sulfur (S) impregnated in the cathode electrolyte solution may be electrically connected with the metal housing 100. Further, an anode current collector may be, of course, inserted via a through-hole of the cover 110, so that a certain part of the anode current collector is impregnated into the molten sodium anode supported in the wicking tube 420.

Figure 2:
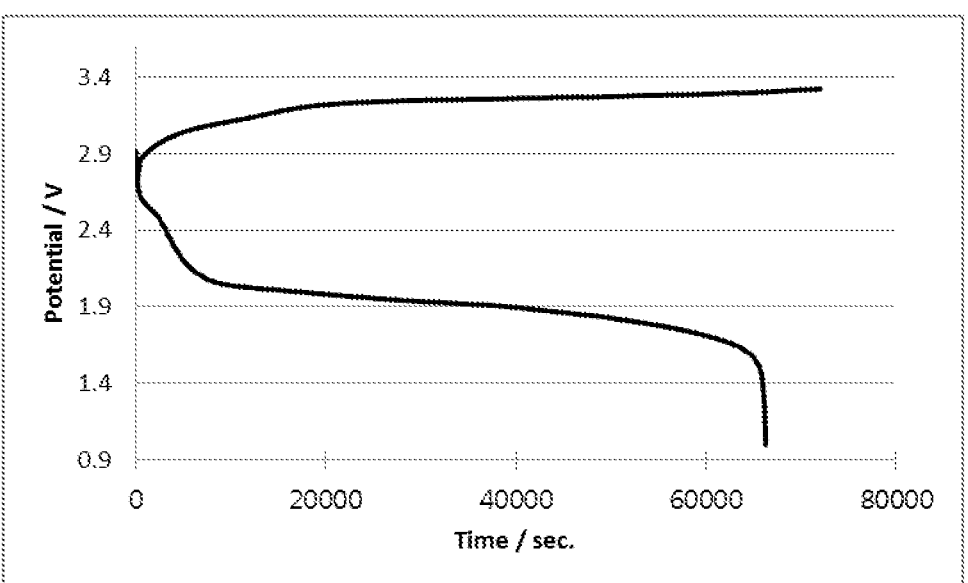
FIG. 2 is a drawing showing a charging and discharging characteristic of a sodium secondary battery according to an exemplary embodiment of the present invention.

FIG. 2 is a drawing showing a charging and discharging characteristic of a sodium secondary battery according to an exemplary embodiment of the present invention. Specifically, FIG. 2 shows a battery using $Na_2S$ as a cathode, Na as an anode, and for an electrolyte, 5 wt % of $NaAlCl_4$ dissolved in N-methylformamide (NMF) as a cathode electrolyte, at an operating temperature of 150° C. As seen from FIG. 2, the battery reacted at a current of 3 mA for about 66000 seconds even at a low operating temperature of 150° C., and was operated at charging voltage of 3.2V, and discharging voltage of 1.95V.

The sodium secondary battery according to the present invention is operable at a low temperature of 100 to 200° C., as compared with a sodium sulfur battery operated at 300° C. or more, and a ZEBRA battery operated at 250° C. or more; despite of the low temperature operation, has an advantage of having high energy density; due to the operation at a relatively low temperature, easily solves the problems of thermal stability and heat sealing; has a more mitigated vessel design condition for maintaining airtightness; and has reduced thermal energy required to maintain the temperature, thereby increasing economic feasibility.

What is claimed is:

1. A sodium secondary battery comprising: an anode containing sodium (Na); a cathode containing sulfur (S); a cathode electrolyte solution being in contact with the cathode and capable of conducting sodium ions into and from a solid electrolyte membrane; and a solid electrolyte (separator) separating the anode and the cathode electrolyte solution and having sodium ion conductivity,
wherein the cathode electrolyte solution is a molten phase of a sodium salt of following Chemical Formula 2-2:

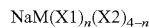
$NaM(X1)_n(X2)_{4-n}$      [Chemical Formula 2-2]

wherein M is an element selected from the group consisting of metals and metalloids having an oxidation number of 3; X1 and X2 are halogen elements different from each other; and n is a real number of $0<n<4$, and wherein the cathode electrolyte solution does not contain an organic solvent.

2. The sodium secondary battery of claim 1, wherein it generates a cathode reaction of following Reaction Formula 1 during discharge, and a cathode reaction of following Reaction Formula 2 during charge:

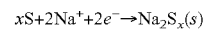
$xS+2Na^++2e^-\rightarrow Na_2S_x(s)$      [Reaction Formula 1]

wherein (s) refers to a solid phase; and x is a natural number of 1 to 5, $$Na_2S_x(s) \rightarrow xS + 2Na^+ + 2e^- \qquad \text{[Reaction Formula 2]}$$

wherein (s) refers to a solid phase; and x is a natural number of 1 to 5.

3. The sodium secondary battery of claim 2, wherein the sulfur in the cathode is present in a liquid state at an operating temperature of the sodium secondary battery.

4. The sodium secondary battery of claim 1, wherein it has an operating temperature of 100° C. to 200° C.

5. The sodium secondary battery of claim , wherein the solid electrolyte (separator) is sodium superionic conductor (NASICON).

* * * * *

UNITED STATES PATENT AND TRADEMARK OFFICE
CERTIFICATE OF CORRECTION

PATENT NO. : 10,153,517 B2  
APPLICATION NO. : 14/824500  
DATED : December 11, 2018  
INVENTOR(S) : Je Hyun Chae et al.

Page 1 of 1

It is certified that error appears in the above-identified patent and that said Letters Patent is hereby corrected as shown below:

In the Claims

Column 13, Line 9, Claim 5, delete "claim ," and insert -- claim 1, --

Signed and Sealed this
Sixteenth Day of April, 2019

Andrei Iancu
*Director of the United States Patent and Trademark Office*